US008038332B2

(12) United States Patent
Lin

(10) Patent No.: US 8,038,332 B2
(45) Date of Patent: Oct. 18, 2011

(54) VIEWING AND LIGHTING DEVICE

(76) Inventor: Tzu-Tang Lin, Taipei (TW)

( * ) Notice: Subject to any disclaimer, the term of this patent is extended or adjusted under 35 U.S.C. 154(b) by 78 days.

(21) Appl. No.: 12/437,057

(22) Filed: May 7, 2009

(65) Prior Publication Data

US 2010/0284200 A1  Nov. 11, 2010

(51) Int. Cl.
*F21V 23/04* (2006.01)
*F21V 19/02* (2006.01)

(52) U.S. Cl. .................. 362/494; 362/528; 362/530

(58) Field of Classification Search .................. 362/396, 362/419, 470, 473, 474, 477, 478, 485, 523, 362/528, 530, 540, 545, 548, 549
See application file for complete search history.

(56) References Cited

U.S. PATENT DOCUMENTS

| 2,933,019 | A | * | 4/1960 | Milton et al. | 74/502.1 |
| 4,135,788 | A | * | 1/1979 | Sargis | 359/842 |
| 4,603,944 | A | * | 8/1986 | Greenlaw et al. | 359/818 |
| 4,709,306 | A | * | 11/1987 | Harris et al. | 362/530 |
| 4,715,681 | A | * | 12/1987 | Johnson | 359/526 |
| 5,349,920 | A | * | 9/1994 | Koizumi | 116/28 R |
| 6,220,717 | B1 | * | 4/2001 | Pastore | 359/871 |
| 6,805,473 | B2 | * | 10/2004 | Beard | 362/474 |
| 7,488,099 | B2 | * | 2/2009 | Fogg et al. | 362/464 |
| 7,651,229 | B1 | * | 1/2010 | Rimback et al. | 359/840 |

* cited by examiner

*Primary Examiner* — Hargobind Sawhney

(57) ABSTRACT

A viewing and lighting device includes a side-view mirror formed with a ball, a lamp provided on the side-view mirror, a flexible tube, a first clip attached to an end of the flexible tube and used to clip a portion of the side-view mirror, a second clip attached to another end of the flexible tube and used to clip a portion of a vehicle and a controller provided on the vehicle and used to control the lamp.

10 Claims, 7 Drawing Sheets

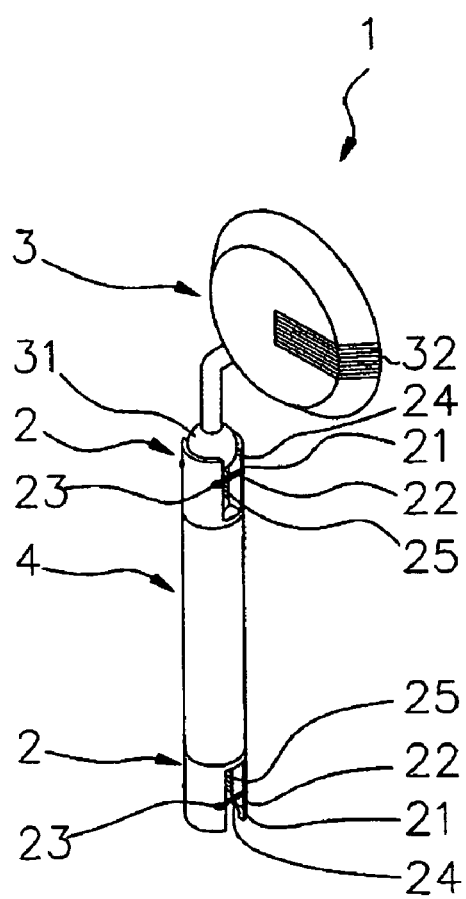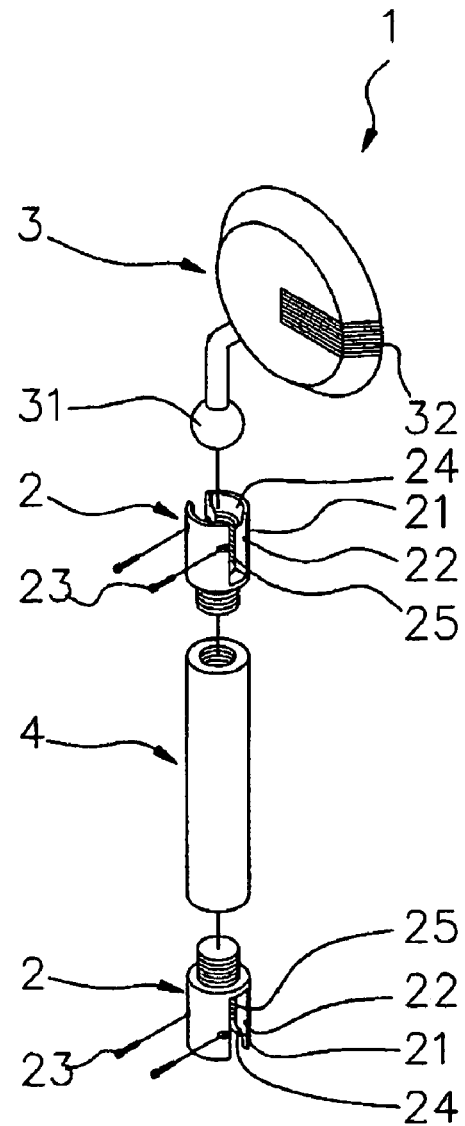
Fig 1
Fig 2

US 8,038,332 B2

VIEWING AND LIGHTING DEVICE

FIELD OF THE INVENTION

The present invention relates to a viewing and lighting device for a vehicle such as a scooter, motorcycle, bicycle or tricycle and, more particularly, to a combination of a side-view mirror with a lamp.

RELATED PRIOR ART

There have been various side-view mirrors for scooters, motorcycles, bicycles, tricycles or other vehicles with a single front wheel. Some side-view mirrors can be rotated along a single axis. Other side-view mirrors can be rotated about two axes. For cars, scooters or motorcycles, there have been side-view mirrors that make sound and/or emit light. For bicycles, there has been devised a wireless turn signal.

The present invention is therefore intended to obviate or at least alleviate the problems encountered in prior art.

SUMMARY OF THE INVENTION

The primary objective of the present invention is to provide a vehicle with a viewing and lighting device.

To achieve the foregoing objective, the viewing and lighting device includes a side-view mirror formed with a ball, a lamp provided on the side-view mirror, a flexible tube, a first clip attached to an end of the flexible tube and used to clip a portion of the side-view mirror, a second clip attached to another end of the flexible tube and used to clip a portion of a vehicle and a controller provided on the vehicle and used to control the lamp.

Other objectives, advantages and features of the present invention will become apparent from the following description referring to the attached drawings.

BRIEF DESCRIPTION OF THE DRAWINGS

The present invention will be described via detailed illustration of three embodiments referring to the drawings.

FIG. 1 is a perspective view of a viewing and lighting device according to the first embodiment of the present invention.

FIG. 2 is an exploded view of the viewing and lighting device shown in FIG. 1.

DETAILED DESCRIPTION OF THE EMBODIMENTS

Figure 3:
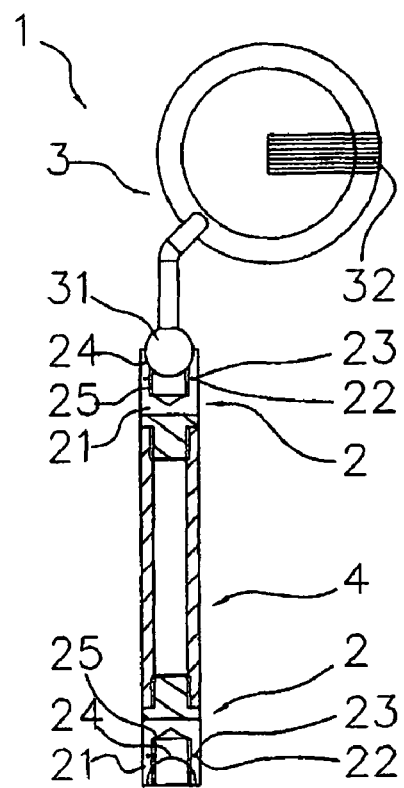
FIG. 3 is a cross-sectional view of the viewing and lighting device shown in FIG. 1.

Referring to FIGS. 1, 2, 3, 6 and 7, there is shown a viewing and lighting device 1 according to a first embodiment of the present invention. The viewing and lighting device 1 includes a flexible tube 4, two clips 2 connected to flexible tube 4, a side-view mirror 3 connected to one of the clips 2 and a controller 5.

The flexible tube 4 can be made of metal such as nickel-titanium alloy, aluminum, copper and tin or a non-metal material such as PEI, which has been used in the medical field for vessel-expanding implants, tubes and threads. The flexible tube 4 can include a metal tube wrapped with a non-metal sheath. The flexible tube 4 includes two threads formed on an internal side thereof, each near an end thereof.

Each of the clips 2 includes a thread at an end and a gap in another end, thus dividing the clip 2 into two prongs 21. The thread is engaged with one of the threads on the internal side of the flexible tube 4, thus connecting the clip 2 to the flexible tube. Each of the prongs 21 includes two apertures 22 defined therein. A screw 23 can be driven in each of the apertures 22 to move the prongs 21 towards each other. Moreover, each of the clips 2 includes a socket 24 and a screw hole 25 therein. The socket 24 is in compliance with a portion of a ball. The screw hole 25 is located deeper than the socket 24.

The side-view mirror 3 includes a shell, a rod extended from the shell and a ball 31 formed on the rod. The ball 31 is rotationally disposed in the socket 24 of one of the clips 2, thus forming a ball-and-socket structure for allowing rotation of the side-view mirror 3 relative to the clip 2.

The lamp includes a lamp screen 32 mounted on the shell of the side-view mirror 3 for covering a light bulb or at least one light-emitting diode ("LED") in the shell of the side-view mirror 3. A power supply 33, a circuit 34 and a wireless receiver 35 are disposed in the shell of the side-view mirror 3. The power supply 33 includes at least one battery. Energized with the power supply 33, the circuit 34 controls the light bulb or LED to flash. The wireless receiver 35 is connected to the circuit 34.

The wireless controller 5 includes a switch 51, a power supply 52, a circuit 53 and a wireless transmitter 54. The power supply 52 includes at least one battery. Energized with the power supply 52, the circuit 53 controls the wireless transmitter 54 to transmit a wireless signal. The switch 51 is connected to the circuit 53.

Figure 6:
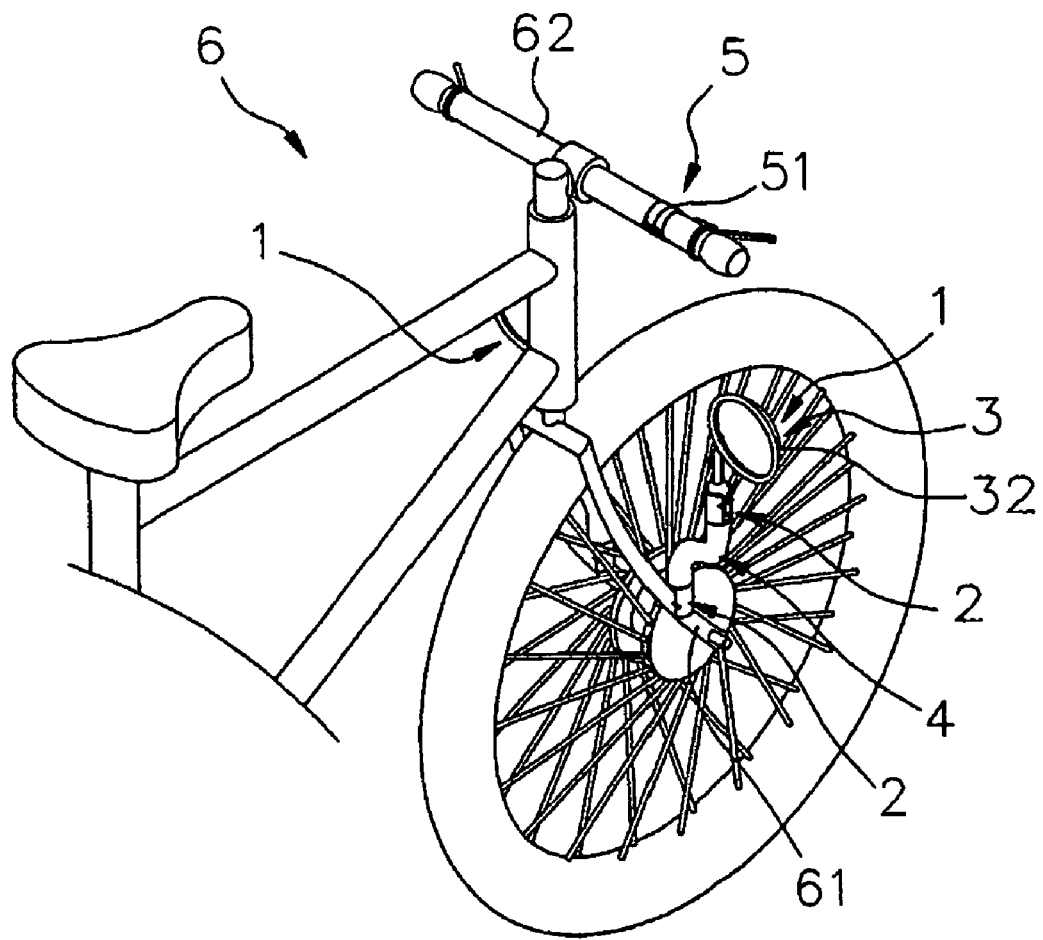
FIG. 6 is a perspective, partial view of a bicycle equipped with the viewing and lighting device shown in FIG. 1.
Figure 7:
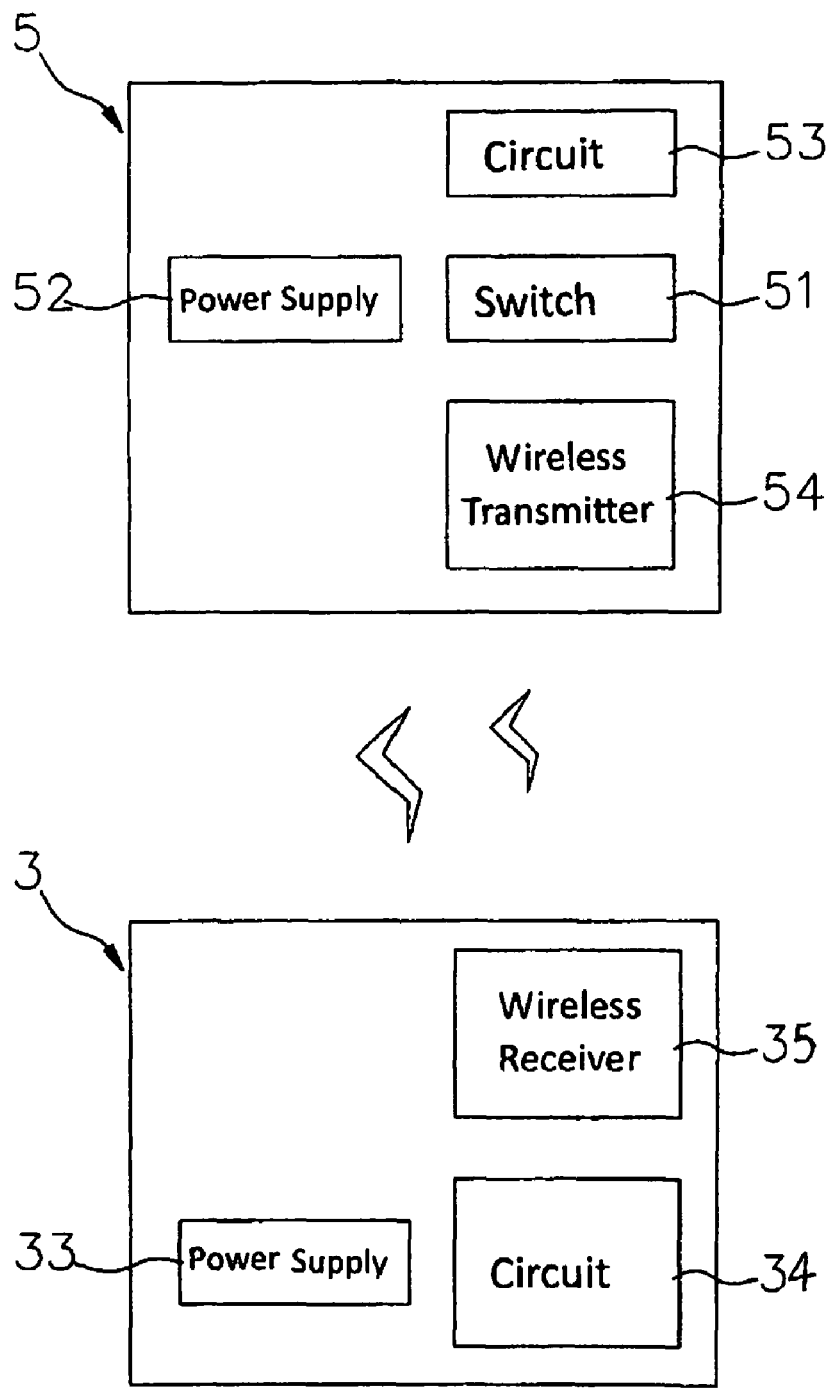
FIG. 7 is a block diagram of a circuit used in the viewing and lighting device shown in FIG. 1.

As best shown in FIG. 6, one of the clips 2 clips a prong of a fork 61 of a bicycle 6, thus connecting the viewing and lighting device 1 to the bicycle 6. The flexible tube 4 and the ball-and-socket structure together enable a rider to locate the side-view mirror 3 in a desired position and at a desired angle.

The controller 5 is attached to the handle bar 62 of the bicycle 6. The rider can operate the switch 51 to actuate the circuit 53 to make the wireless transmitter 54 transmit a wireless signal. On receiving the wireless signal through the wireless receiver 35, the circuit 34 instructs the light bulb or LED to flash or emit light stably.

Figure 8:
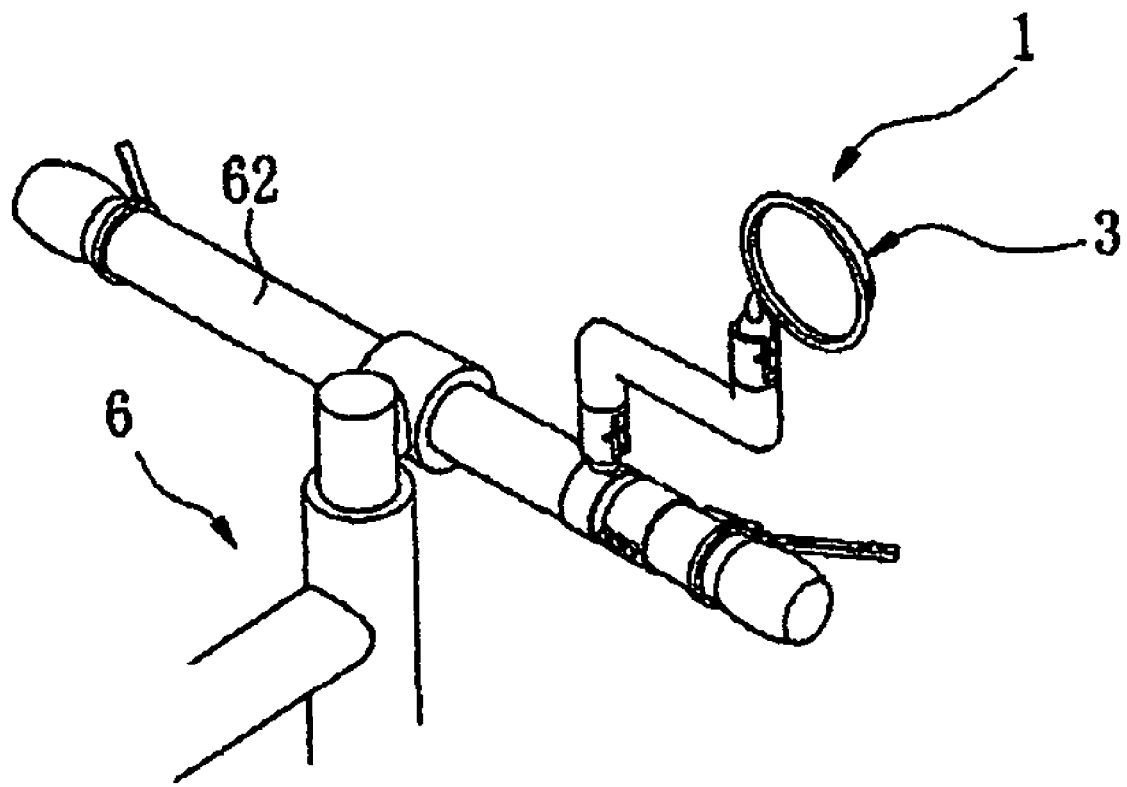
FIG. 8 is a perspective, partial view of a motor equipped with the viewing and lighting device shown in FIG. 4.
Figure 9:
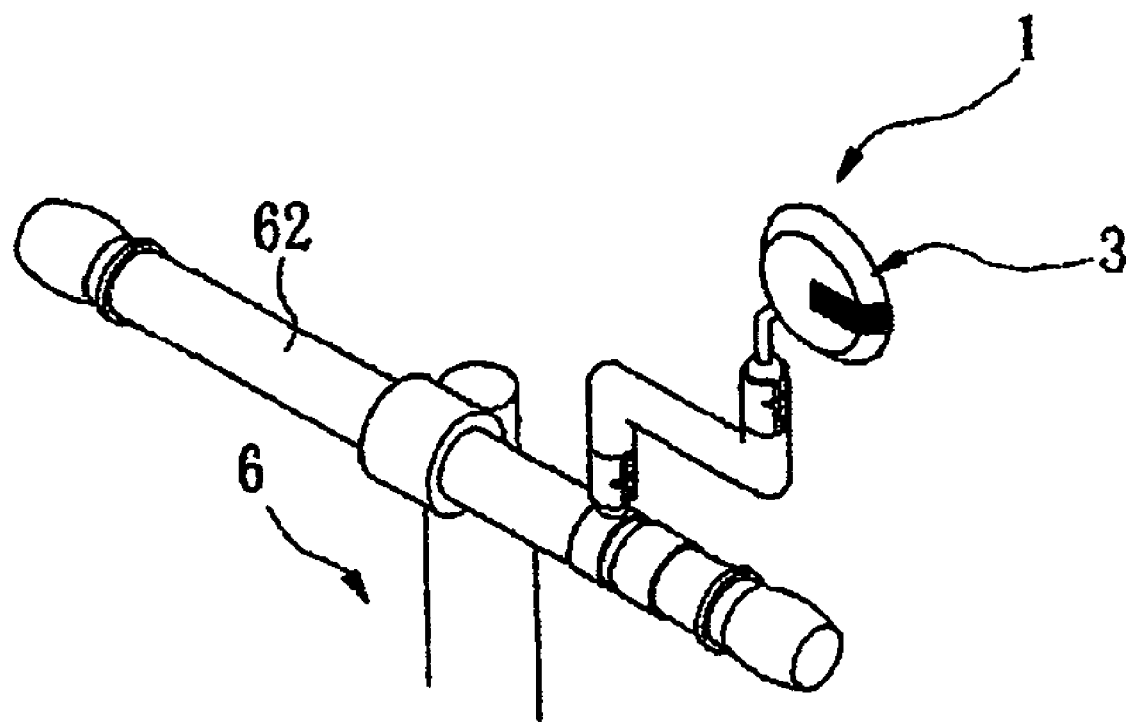
FIG. 9 is another perspective, partial view of the motor equipped with the viewing and lighting device shown in FIG. 8.

Referring to FIGS. 8 and 9, one of the clips 2 clips the handlebar 62 of the bicycle 6. If two viewing-and-lighting devices 1 are provided on the handlebar 62, they can be used as turn signals.

Figure 4:
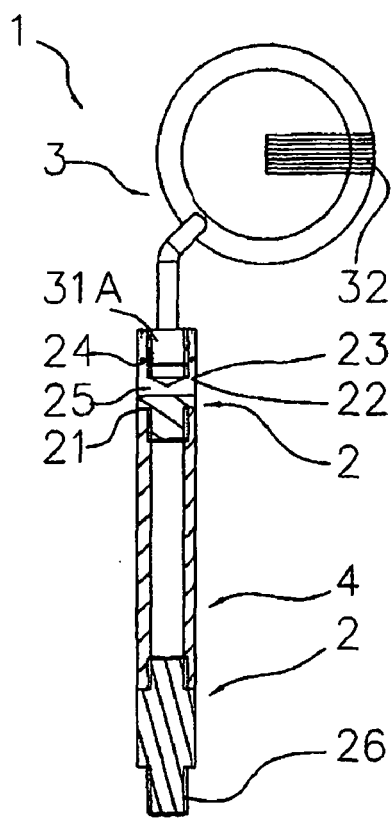
FIG. 4 is a cross-sectional view of a viewing and lighting device according to the second embodiment of the present invention.

Referring to FIG. 4, there is shown a viewing and lighting device according to a second embodiment of the present invention. The second embodiment is like the first embodiment except two things. Firstly, there is used a threaded bolt 26 instead of one of the clips 2. The threaded bolt 26 includes a thread for engagement with a related one of the threads on the internal side of the flexible tube 4 and another thread for insertion in a screw hole in a socket for receiving a portion of a conventional side-view mirror for a motorcycle.

Secondly, the side-view mirror 3 includes a thread 31A instead of the ball 31. The thread 31 is driven in the screw hole 25 in the clip 2, thus connecting the side-view mirror 3 to the clip 2.

Figure 5:
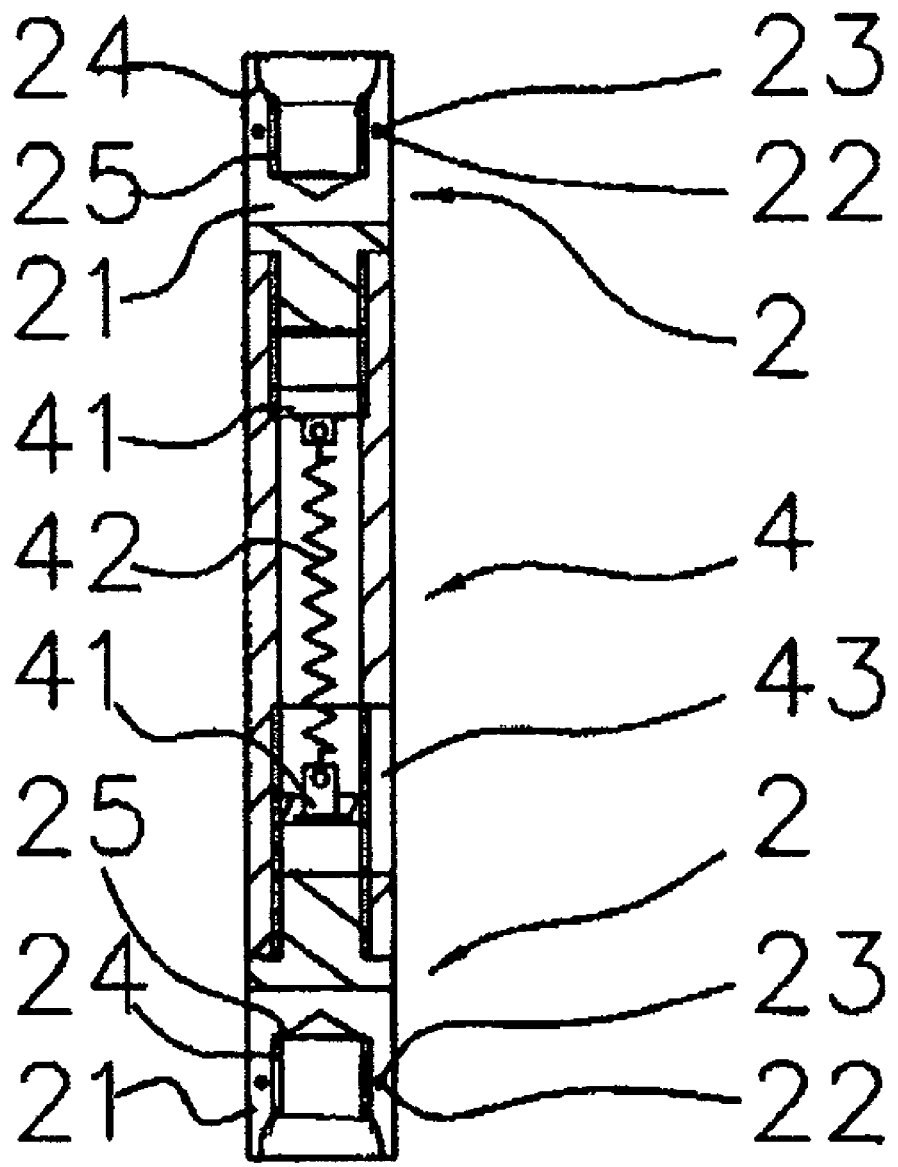
FIG. 5 is a cross-sectional view of a viewing and lighting device according to the third embodiment of the present invention.

Referring to FIG. 5, there is shown a viewing and lighting device according to a third embodiment of the present invention. The third embodiment is like the first embodiment except including two adjusting elements 41 movably disposed in the flexible tube 4, a spring 42 for interconnecting the adjusting elements 41 and a slot 43 defined in the flexible tube 4. Each of the adjusting elements 41 includes a thread engaged with a related one of the threads on the internal side of the flexible tube 4. The slot 43 allows access to one of the adjusting elements 41. The adjusting element 41 is used to adjust the tension in the spring 42, thus adjusting the flexibility of the flexible tube 4.

The present invention has been described via the detailed illustration of the embodiments. Those skilled in the art can derive variations from the embodiments without departing from the scope of the present invention. Therefore, the embodiments shall not limit the scope of the present invention defined in the claims.

What is claimed is:

1. A viewing and lighting device comprising:
   a side-view mirror formed with a ball;
   a lamp provided on the side-view mirror;
   a flexible tube;
   a first clip attached to an end of the flexible tube and used to clip a portion of the side-view mirror;
   wherein the first clip comprises a socket for receiving the ball;
   a second clip attached to another end of the flexible tube and used to clip a portion of a vehicle; and
   a controller provided on the vehicle and used to control the lamp.

2. The viewing and lighting device according to claim 1, wherein each of the first and second clips comprises two prongs each comprising two apertures each for receiving a fastener.

3. The viewing and lighting device according to claim 1, wherein the mirror comprises a thread thereon, and the first clip comprises a screw hole for receiving the thread.

4. The viewing and lighting device according to claim 1 comprising:
   two adjusting elements movably disposed in the flexible tube; and;
   a spring for interconnecting the adjusting elements, wherein the adjusting elements are movable relative to each other to change the tension in the spring and therefore the flexibility of the flexible tube.

5. The viewing and lighting device according to claim 1, wherein the lamp comprises a circuit, a wireless receiver connected to the circuit and a power supply for energizing the circuit, and the controller comprises a circuit, a wireless transmitter connected to the circuit thereof, a power supply for energizing the circuit thereof and a switch operable for actuate the circuit thereof.

6. The viewing and lighting device according to claim 1, wherein the lamp comprises a circuit, a wireless receiver connected to the circuit and a power supply for energizing the circuit, and the controller comprises a circuit, a wireless transmitter connected to the circuit thereof, a power supply for energizing the circuit thereof and a switch operable for actuate the circuit thereof.

7. A viewing and lighting device comprising:
   a side-view mirror formed with a ball;
   a lamp provided on the side-view mirror;
   a flexible tube;
   a clip attached to an end of the flexible tube and used to clip a portion of the side-view mirror;
   wherein the clip comprises a socket for receiving the ball;
   a threaded bolt attached to another end of the flexible tube and used for assertion in a screw hole in a portion of a vehicle; and
   a controller provided on the vehicle and used to control the lamp.

8. The viewing and lighting device according to claim 7, wherein the first clip comprises two prongs each comprising two apertures each for receiving a fastener.

9. The viewing and lighting device according to claim 7, wherein the mirror comprises a thread thereon, and the clip comprises a screw hole for receiving the thread.

10. The viewing and lighting device according to claim 7 comprising:
    two adjusting elements movably disposed in the flexible tube; and;
    a spring for interconnecting the adjusting elements, wherein the adjusting elements are movable relative to each other to change the tension in the spring and therefore the flexibility of the flexible tube.

* * * * *